(12) United States Patent
Kwak

(10) Patent No.: US 9,270,023 B2
(45) Date of Patent: Feb. 23, 2016

(54) RANDOM JITTER BEAMFORMING METHOD AND TRANSMITTER AND RECEIVER USING THE SAME

(71) Applicant: Electronics and Telecommunications Research Institute, Daejeon-si (KR)

(72) Inventor: Byung-Jae Kwak, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 568 days.

(21) Appl. No.: 13/657,073

(22) Filed: Oct. 22, 2012

(65) Prior Publication Data

US 2013/0099973 A1 Apr. 25, 2013

(30) Foreign Application Priority Data

Oct. 21, 2011 (KR) .................. 10-2011-0108234
Oct. 22, 2012 (KR) .................. 10-2012-0117389

(51) Int. Cl.
*H01Q 3/00* (2006.01)
*H01Q 3/26* (2006.01)
*H04B 7/06* (2006.01)
*H04B 7/08* (2006.01)

(52) U.S. Cl.
CPC .............. *H01Q 3/26* (2013.01); *H04B 7/0617* (2013.01); *H04B 7/086* (2013.01)

(58) Field of Classification Search
CPC ............. H01Q 3/00; H01Q 3/16; H01Q 3/28; H01Q 3/26; H04B 7/0617; H04B 7/086

USPC .................................. 342/368, 379, 382, 383
See application file for complete search history.

(56) References Cited

U.S. PATENT DOCUMENTS

| | | | | |
|---|---|---|---|---|
| 5,862,459 A | * | 1/1999 | Charas ........................ | 455/114.3 |
| 6,011,520 A | * | 1/2000 | Howell et al. .................. | 343/769 |
| 2009/0323773 A1 | * | 12/2009 | Bala et al. ...................... | 375/141 |
| 2010/0112952 A1 | | 5/2010 | Molnar et al. ................ | 455/63.1 |
| 2011/0122026 A1 | * | 5/2011 | DeLaquil et al. ............. | 342/372 |

FOREIGN PATENT DOCUMENTS

KR 2009-0043174 A 5/2009

OTHER PUBLICATIONS

Chung, Jaechak et al., "A Random Beamforming Technique in MIMO Systems Exploiting Multiuser Diversity," IEEE Journal on Selected Areas in Communications, vol. 21(5):848-855 (2003).

* cited by examiner

*Primary Examiner* — Harry Liu
(74) *Attorney, Agent, or Firm* — Nelson Mullins Riley & Scarborough LLP; Anthony A. Laurentano; Michael Malone

(57) ABSTRACT

A random jitter beamforming method for reducing the influence of a side lobe to decrease a beam width, and a transmitter and a receiver using the same are provided. The random jitter beamforming method includes dividing a series of binary sequences to generate a plurality of bit groups, designating a beam pattern, corresponding to each of the bit groups, from a set of two or more beam patterns having the same gain and phase in a target direction, and forming a beam with the corresponding beam pattern, for each of the bit groups.

13 Claims, 11 Drawing Sheets

ND TRANSMITTER AND
RANDOM JITTER BEAMFORMING METHOD AND TRANSMITTER AND RECEIVER USING THE SAME

CROSS-REFERENCE TO RELATED APPLICATION

This application claims priority from and the benefit under 35 U.S.C. §119(a) of Korean Patent Application Nos. 10-2011-0108234, filed on Oct. 21, 2011, 10-2012-0117389, filed on Oct. 22, 2012, the entire disclosures of which are incorporated herein by references for all purposes.

BACKGROUND

1. Field

The following description relates to beamforming technology, and more particularly, to a random jitter beamforming method for reducing the influence of a side lobe to achieve an effect of decreasing a beam width, and to a transmitter and a receiver using the same.

2. Description of the Related Art

Beamforming denotes technology in which, by concentrating energy (which is radiated from an antenna) in a specific direction in a space, a receiver receives a signal in a desired direction, and a transmitter transmits a signal in a desired direction.

Beamforming is often called spatial filtering, in which case a beam width is determined depending on the number of antennas and an antenna array structure.

However, conventional beamforming schemes have a limitation in obtaining high beam resolution for reducing a beam width.

SUMMARY

The following description relates to a random jitter beamforming method for reducing the influence of a side lobe to achieve an effect of decreasing a beam width, and to a transmitter and a receiver using the same.

In one general aspect, a random jitter beamforming method includes: dividing a series of binary sequences to generate a plurality of bit groups; designating a beam pattern, corresponding to each of the bit groups, from a set of two or more beam patterns having the same gain and phase in a target direction; and forming a beam with the corresponding beam pattern, for each of the bit groups.

The designating of the beam pattern may include randomly designating one beam pattern from the set of two or more beam patterns, for each of the bit groups.

The designating of the beam pattern may include designating the beam pattern to each of the bit groups according to a predetermined rule.

In another general aspect, a transmitter using random jitter beamforming includes: a bit group generation unit configured to divide a series of transmission binary sequences to generate a plurality of bit groups; a beam control unit configured to control a set of two or more beam patterns having the same gain and phase in a target direction; a beamforming unit configured to designate a corresponding beam pattern among the two or more beam patterns to each of the bit groups; a D/A conversion unit configured to convert each of the bit groups, of which the corresponding beam pattern has been designated, into an analog signal; and a transmission unit configured to transmit the analog signal.

In another general aspect, a receiver using random jitter beamforming includes: a reception unit configured to receive an RF signal through an antenna array, and convert the RF signal into a continuous time baseband signal; an A/D conversion unit configured to convert the continuous time baseband signal into discrete time domain signals equal to the number of antennas included in the antenna array; and a beamforming unit configured to perform beamforming on the frequency domain signal to generate a random-jitter-beamformed signal.

The receiver may further include a bit group combination unit configured to combine bit groups from a plurality of the random-jitter-beamformed signals to generate a reception data sequence.

The domain conversion unit may perform a fast Fourier transform to convert the discrete time domain signal into a frequency domain signal.

In another general aspect, a receiver using random jitter beamforming includes cross-correlation coefficient calculation unit configured to calculate a cross-correlation coefficient with a binary sequence vector and a reception signal vector that are transmitted using random jitter beamforming.

When the cross-correlation coefficient is greater than a predetermined threshold, the cross-correlation coefficient calculation unit may determine a corresponding device as a target device.

Other features and aspects will be apparent from the following detailed description, the drawings, and the claims.

Figure 1:
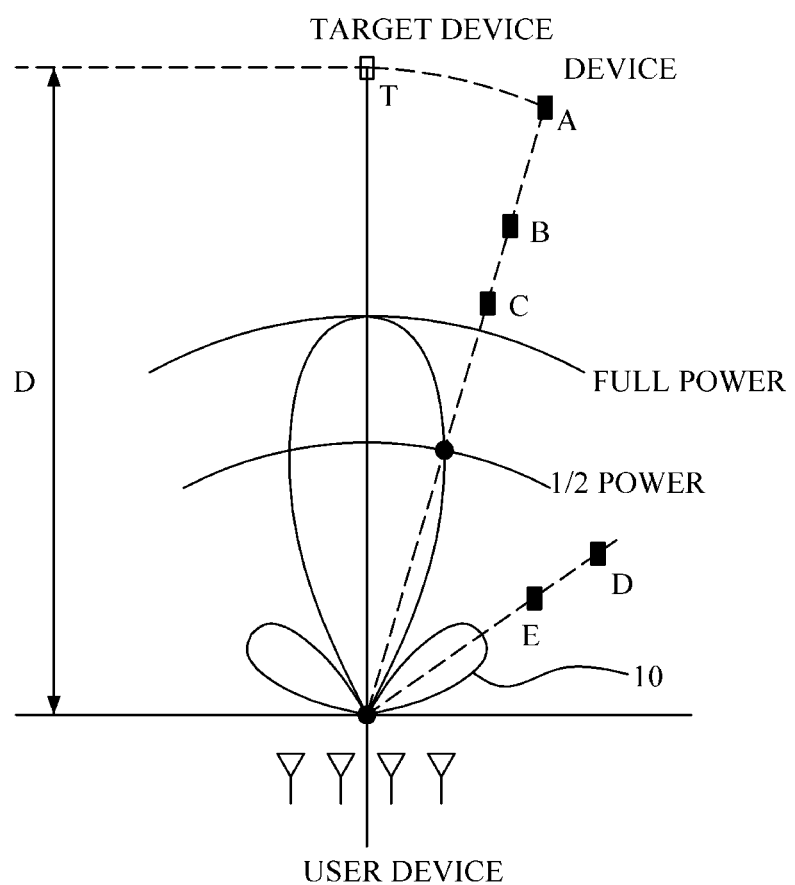
FIG. 1 is a diagram illustrating a relationship between a transmission beam pattern and devices with respect to positions of the devices.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a relationship between a transmission beam pattern and devices with respect to positions of the devices.

In FIG. 1, an equidistant linear antenna array including four antennas is used.

In FIG. 1, it is assumed that devices A to C have a ½ power gain and devices D and E are disposed in a direction of a side lobe 10.

For simplification of a description, when the loss of a free-space path is assumed, the devices B and D have the same received signal strength (RSS) as a target device T. Also, the devices C and E have RSS two times that of the target device T.

A case in which a user transmits a signal and desires for only the target device T to receive the signal is considered. Although the device A has half of the RSS of the target device T, a signal-to-noise ratio (SNR) of the device A may be sufficiently high to receive the signal transmitted from the user. Furthermore, the devices B and D and the devices C and E may have RSS one time or two times that of the target device T.

That is, when the devices A to E are sufficiently close to the user in terms of a Euclidean distance or sufficiently close to the target device T in terms of an angular distance, the devices A to E receive a signal transmitted from the user. This is not a result the user desires.

To solve this problem, a beamforming scheme independent of the side lobe 10 is needed. Furthermore, the beamforming scheme has improved angular resolution, and thus it should be possible not to increase the number of antennas. This is because the maximum number of antennas is limited in mobile devices.

In the proposed random jitter beamforming method, the response of an antenna array is fixed in a direction of the target device, and fluctuates in other directions.

A set of K predetermined array coefficient vectors is defined. All array coefficient vectors included in the set are designed such that beam patterns have a fixed gain having the same value in the direction of the target device T (for example, 0 degrees), but have different gains in other directions. Each of the beam patterns is selected from among the K predetermined array coefficient vectors.

Figure 2:
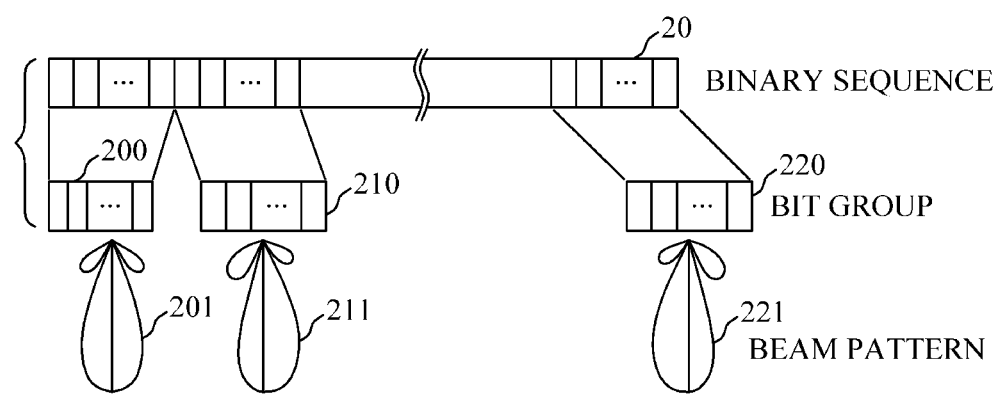
FIG. 2 is a diagram illustrating relationships between a binary sequence, a bit group, and a beam pattern.

FIG. 2 is a diagram illustrating relationships between a binary sequence, a bit group, and a beam pattern.

As illustrated in FIG. 2, a binary sequence 20 is divided into a plurality of bit groups 200, 210, . . . , 220. The bit groups 200, 210, . . . , 220 are transmitted with different beam patterns that are randomly selected from the set of K predetermined beam patterns.

That is, the bit group 200 is transmitted with the beam pattern 201, the bit group 210 is transmitted with the beam pattern 211, and the bit group 220 is transmitted with the beam pattern 221.

Figure 3A:
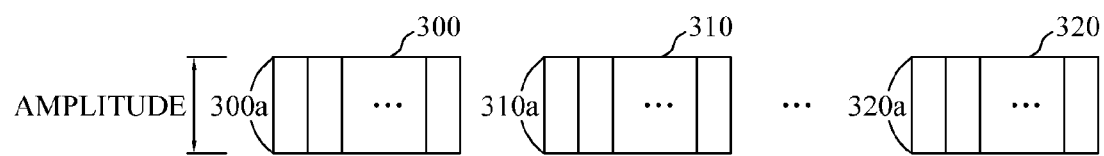
FIG. 3A is a diagram illustrating the amplitudes of bit groups received from a target device.

FIG. 3A is a diagram illustrating the amplitudes of bit groups received from a target device.

As illustrated in FIG. 3A, the target device T receives all bit groups 300, 310, . . . , 320 at the same amplitude. According to random jitter beamforming, this is because all beam patterns have the same array gain in a target direction.

Accordingly, the respective amplitudes $300a$, $310a$, . . . , $320a$ of the received bit groups 300, 310, . . . , 320 are equal.

Figure 3B:
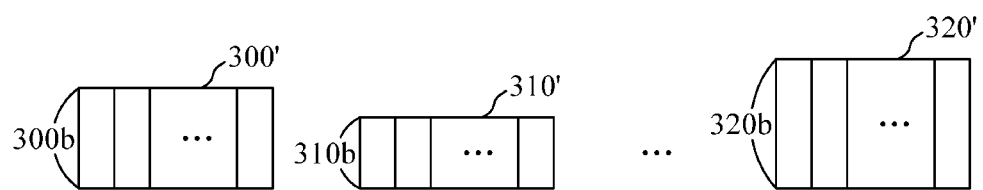
FIG. 3B is a diagram illustrating the amplitudes of bit groups received in a direction different from a target device.

FIG. 3B is a diagram illustrating the amplitudes of bit groups received in a direction different from a target device.

In devices located in a direction different from that of the target device T, even though an SNR is high, the respective gains of bit groups $300'$, $310'$, . . . , $320'$ fluctuate. That is, the respective amplitudes $300a'$, $310a'$, . . . , $320a'$ of received bit groups $300'$, $310'$, . . . , $320'$ have different values. As described above, when random jitter beamforming is used, the reason that RSSs of bit groups received by a device located in a direction different from a target direction are not constant is due to random jitter applied when a transmitter transmits data.

Moreover, as an angular distance becomes farther away from the target device T, the sway of a gain between bit groups increases.

Figure 4:
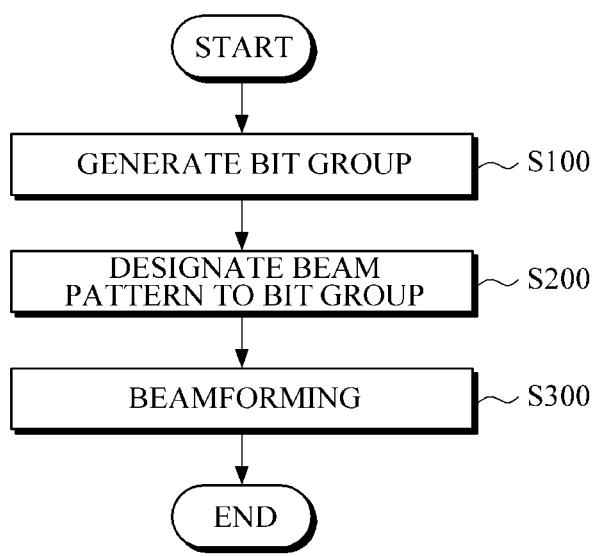
FIG. 4 is a flowchart illustrating an example of a random jitter beamforming method according to an embodiment.

FIG. 4 is a flowchart illustrating an example of a random jitter beamforming method according to an embodiment.

As illustrated in FIG. 4, the random jitter beamforming method includes a bit group generation operation S100, a beam pattern designation operation S200, and a beam transmission operation S300.

The bit group generation operation 100 divides a series of binary sequences to generate a plurality of bit groups.

The beam pattern designation operation S200 designates a beam pattern for each bit group.

In this case, different beam patterns may be designated for two adjacent bit groups. For example, in a set of two beam patterns, a beam pattern BP1 and a beam pattern BP2 may be alternately designated.

Moreover, a beam pattern may be randomly selected from a set of beam patterns and designated to a corresponding bit group, or beam patterns may be sequentially designated according to a predetermined rule.

When a transmission device performs transmission using random jitter beamforming, a receiver device may determine whether the receiver device is a target device.

$\bar{x}$ is assumed as a vector expressing a transmitted binary sequence, and $\bar{r}$ is assumed as a vector expressing a received signal corresponding to the transmitted binary sequence. In this case, a cross-correlation coefficient "ρ" is defined as Equation (1).

$$\rho = \frac{\langle \bar{x}, \bar{r} \rangle}{\sqrt{\langle \bar{x}, \bar{x} \rangle \cdot \langle \bar{r}, \bar{r} \rangle}} \quad (1)$$

where the cross-correlation coefficient "ρ" is calculated by the receiver device, and <a,b> denotes an inner product of a vector "a" and a vector "b."

When the cross-correlation coefficient "ρ" is greater than a predetermined threshold, the receiver device determines the receiver device as the target device. In this case, the receiver device may send an identifier (ID) of the receiver device to the transmission device.

However, when the cross-correlation coefficient "ρ" is less than the predetermined threshold, the receiver device determines the receiver device as not being the target device, and may not reply to the transmission device.

The cross-correlation coefficient "ρ" is normalized with power, and thus dependency on RSS is minimized. However, the cross-correlation coefficient "ρ" is mainly used to measure the consistency of a gain in a received signal.

Figure 5:
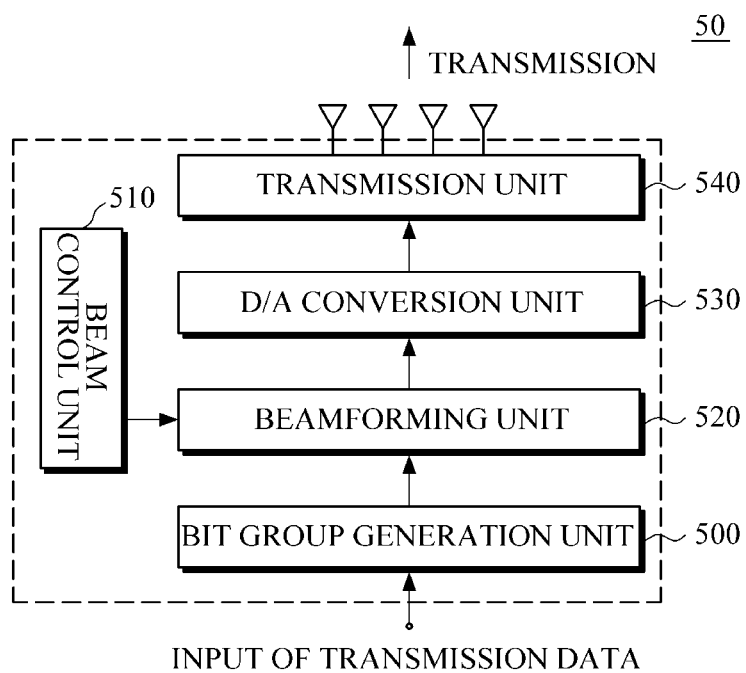
FIG. 5 is a block diagram illustrating an example of a transmitter using random jitter beamforming according to another embodiment.

FIG. 5 is a block diagram illustrating an example of a transmitter using random jitter beamforming according to another embodiment.

As illustrated in FIG. 5, a transmitter 50 using random jitter beamforming includes a bit group generation unit 500, a beam control unit 510, a beamforming unit 520, a digital-to-analog (D/A) conversion unit 530, and a transmission unit 540.

The bit group generation unit 500 divides a series of transmission binary sequences to generate a plurality of bit groups.

The beam control unit 510 defines and stores K array coefficient vectors (K≥2).

The beamforming unit 520 designates a corresponding beam pattern among K beam patterns stored in the beam control unit 510 to each of the bit groups.

The D/A conversion unit 530 converts the discrete time domain signal into a continuous time domain analog signal.

The transmission unit 540 low-noise-amplifies the continuous time domain analog signal, and transmits the amplified signal through an antenna array. Although not shown, when necessary, the transmission unit 540 may further perform intermediate frequency (UF) conversion and amplification.

Figure 6:
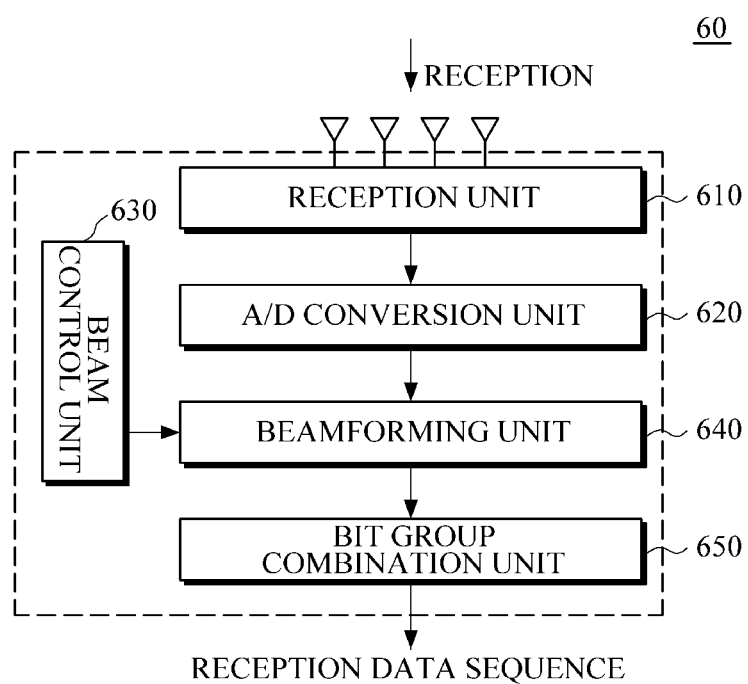
FIG. 6 is a block diagram illustrating an example of a receiver using random jitter beamforming according to another embodiment.

FIG. 6 is a block diagram illustrating an example of a receiver using random jitter beamforming according to another embodiment.

As illustrated in FIG. 6, a receiver 60 using random jitter beamforming includes a reception unit 610, an analog-to-digital (A/D) conversion unit 620, a beam control unit 630, and a beamforming unit 640.

The reception unit 610 receives a radio frequency (RF) signal through the antenna array, and converts the RF signal into a continuous time baseband signal.

The A/D conversion unit 620 converts the continuous time baseband signal into discrete time domain signals equal to the number of antennas included in the antenna array. For example, in a four-antenna scenario, the A/D conversion unit 620 may output four discrete time domain signals. To this end, the A/D conversion unit 620 may need to include four A/D converters.

The beam control unit 630 defines and stores an array coefficient vector for a beam pattern.

The beamforming unit 640 performs beamforming on the frequency domain signal to generate a random-jitter-beamformed signal.

The receiver 60 using random jitter beamforming may further include a bit group combination unit 650. The bit group combination unit 650 combines bit groups from a plurality of the random-jitter-beamformed subcarrier signals to generate a reception data sequence.

The random jitter beamforming method may be very effectively applied to an OFDM system that performs beam switching at a subcarrier level.

Figure 7:
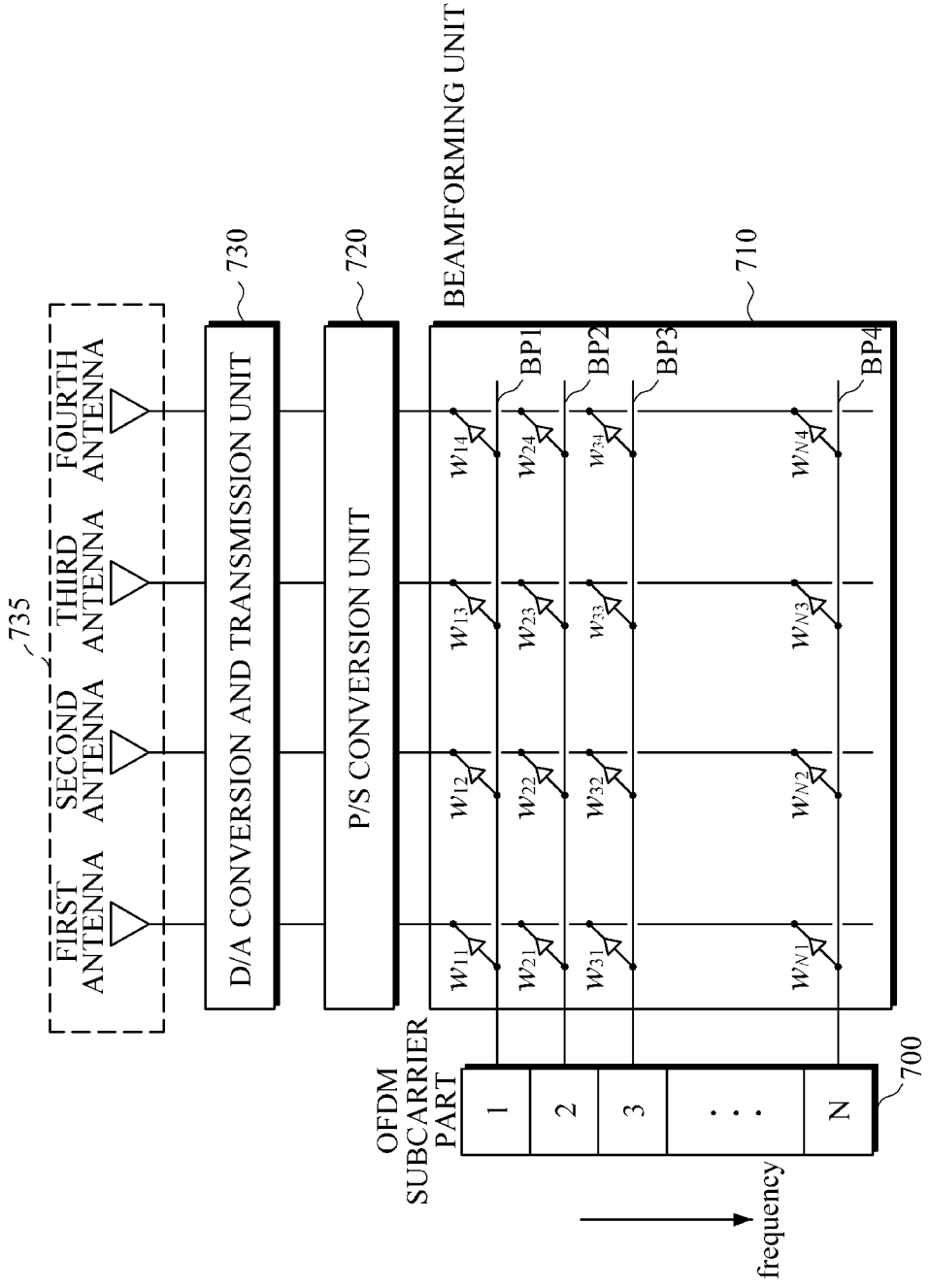
FIG. 7 is a block diagram illustrating an example of an orthogonal frequency division multiplexing (OFDM) transmitter to which a random jitter beamforming scheme is applied.

FIG. 7 is a block diagram illustrating an example of an OFDM transmitter to which the random jitter beamforming method is applied.

In FIG. 7, an $n^{th}$ subcarrier is transmitted with an $n^{th}$ beam pattern.

In this case, an array coefficient "$\omega_{ni}$" is an array coefficient of an $i^{th}$ antenna for the $n^{th}$ subcarrier of an OFDM subcarrier part 700.

In an embodiment of FIG. 7, an antenna array is configured with four antennas, and thus, i=1, ..., 4. Also, n=1, ..., N.

An $n^{th}$ beam pattern (i.e., BPn) may be arbitrarily selected from a set of K predetermined beam patterns. A receiver device need not perform a separate operation for receiving a signal that is transmitted using the random jitter beamforming method. In the embodiment of FIG. 7, a beamforming unit 710 may include a beam control unit that stores an array coefficient for a beam pattern.

Subsequently, a parallel-to-series (P/S) conversion unit 720 converts signals output from the beamforming unit 710 into a frequency domain signal through a fast Fourier transform (FFT), and transfers the frequency domain signal to a D/A conversion and transmission unit 730.

The D/A conversion and transmission unit 730 converts the frequency domain signal into a continuous time domain signal, amplifies the continuous time domain signal to an appropriate level, and transmits the amplified continuous time domain signal through an antenna array 735.

That is, the random jitter beamforming method reduces the influence of a side lobe, thus decreasing the effective beam width of an antenna array.

Fields to which the random jitter beamforming method is applied may be largely divided into two types of fields.

First, there is a target recognition field in which, when a plurality of devices are located at near positions, one of the devices is selected by differentiating the devices.

In the target recognition field, when the existing beamforming technology is used, it is required to use a number of antennas for sufficiently reducing the beam width of an antenna array. Furthermore, even when a number of antennas are used, when a different device is located in a side lobe direction of a beam pattern of an antenna array and causes interference, it is very difficult to overcome the interference and differentiate the different device. Especially, when an interference device is close to a transmitter, power received by the interference device may be higher than that of a target device, and thus, it is difficult to solve an interference problem. On the other hand, the random jitter beamforming method uses the cross-correlation coefficient (which is a value normalized for power of a received signal) as a reference for differentiating devices, thus solving an interference problem.

As an example of applying the target recognition field, there is a transmitter using the random jitter beamforming method.

The transmitter using the random jitter beamforming method sets a direction in which a target device is located as a target direction or a look direction and transmits a known sequence.

In this case, in the target device, the cross-correlation coefficient between a received signal and the known sequence has a value close to 1. On the other hand, in a device located in a direction different from that of the target device, the cross-correlation coefficient has a very small value close to 0.

As described above, the cross-correlation coefficient is calculated by a receiver device.

Therefore, the receiver device compares the cross-correlation coefficient with a threshold, and when the cross-correlation coefficient is greater than the threshold, the receiver device determines the receiver device as the target device located in a target direction. However, when the cross-correlation coefficient is less than the threshold, the receiver device determines the receiver device as not being the target device because the receiver device is not located in the target direction.

Second, there is a security-related application field in which, when a plurality of devices are located at near positions, a message is sent to only a specific device, and a normal message is not sent to the other devices.

According to the existing beamforming scheme, when a different device, for example, an eavesdropper, is close to a target device, it is difficult to send a message to only the target device in order for the eavesdropper not to receive the message. Especially, it is difficult to know RSS of the eavesdropper in advance, and thus it is impossible to determine how sharp a beam is effective in use. Also, when the eavesdropper is close to a transmitter, due to the influence of a side lobe, the eavesdropper is capable of receiving a transmission message irrespective of a direction thereof.

On the other hand, according to the random jitter beamforming method, even when RSS of a receiver is very good and an SNR of a received signal is very high, when an angular distance is slightly away from a target direction, it is difficult to decode the received signal. Furthermore, a transmitter is capable of adjusting a beam width, and thus reliability can be more enhanced by increasing or decreasing the number of antennas included in an antenna array.

The performance of random jitter beamforming may be numerically simulated. The following description will be made on a simulation (four-antenna scenario) of Uniform Linear Array (ULA) configured with four antennas, with reference to FIGS. 8 and 9.

The four-antenna scenario, for example, may be applied to general smart phones in which a maximum number of antennas having a band of 5 GHz may be built.

When it is assumed that K=2, two predefined beam patterns are included in a set of beam patterns.

Figure 8:
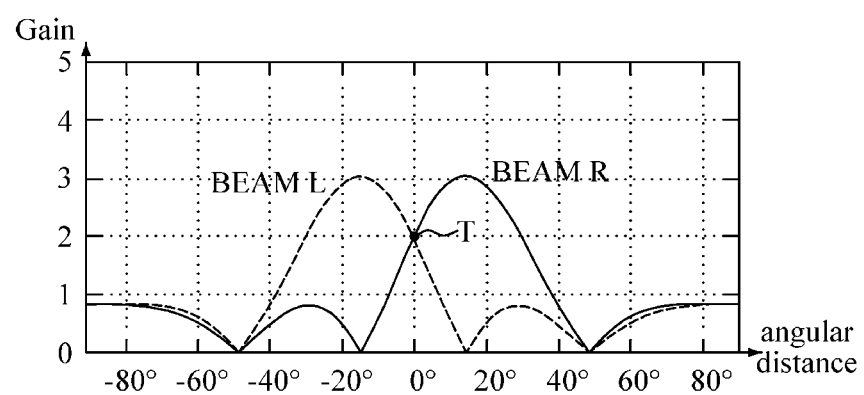
FIG. 8 is a diagram showing the amplitudes of gains in directions of two beam patterns of a four-antenna scenario.

FIG. 8 is a diagram showing the amplitudes of gains in directions of two beam patterns of the four-antenna scenario.

Figure 9:
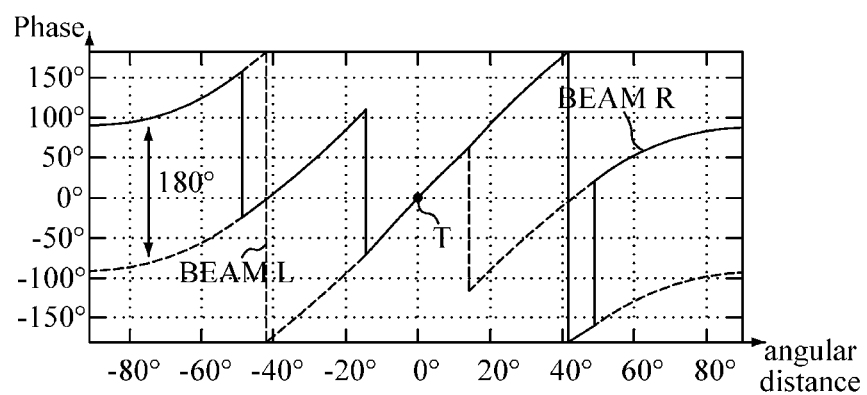
FIG. 9 is a diagram showing phase changes in directions of two beam patterns of a four-antenna scenario.

FIG. 9 is a diagram showing phase changes in directions of two beam patterns of the four-antenna scenario.

As shown in FIG. 8, in beam R and beam L, gains in a target direction (0 degrees in the present embodiment) are matched as 2. Also, as shown in FIG. 9, in the beam R and the beam L, phases in the target direction (0 degrees in the present embodiment) are matched as 0.

In the example shown in FIG. 9, two beam patterns may have a 180-degree phase difference in a direction with a slight angular distance from a target direction (0 degrees herein). As such, when K=2 and the two beam patterns have a 180-degree phase difference, the performance of random jitter beamforming can be improved.

Similarly, in a case where three beam patterns are in use, the performance of random jitter beamforming may be improved by introducing a 120-degree (360°/3=120°) difference in phase between the three beam patterns.

By using two well-designed beam patterns, the object of random jitter beamforming can be effectively achieved. This can be checked even through a simulation.

Figure 10:
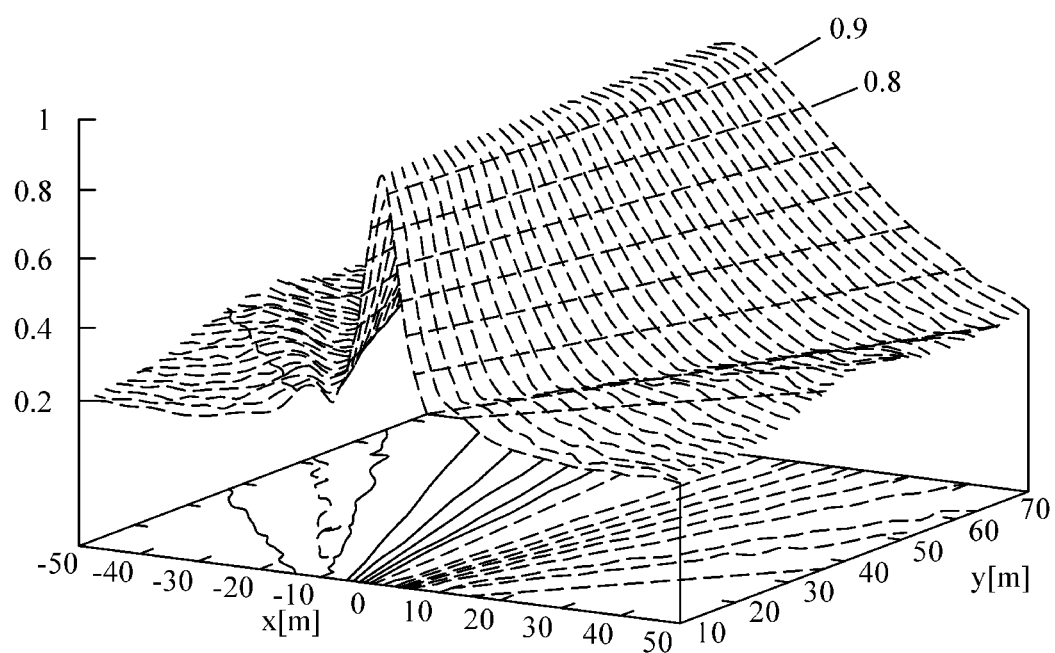
FIG. 10 is a diagram showing an example of a cross-correlation coefficient "p" of four-antenna scenario random jitter beamforming as a three-dimensional (3D) map.

FIG. 10 is a diagram showing an example of a cross-correlation coefficient "p" of four-antenna scenario random jitter beamforming as a 3D map.

As shown, the cross-correlation coefficient is slightly changed according to a distance to a user, and as a monotone decrease function, the influence of a side lobe may be ignored. For example, when a threshold is 0.9, angular resolution may be obtained as a narrow value of 5.2 degrees. Even when 0.8 that is a more conservative value is applied, angular resolution may be obtained as 0.8 degrees.

These features are remarkable compared to a conventional beamforming scheme in which angular resolution of about 21 degrees is obtained for a threshold of 0.9, and angular resolution of about 24 degrees is obtained for a threshold of 0.8. However, the conventional beamforming scheme may have a greater problem in that the cross-correlation coefficient is greater than a threshold in a side lobe direction between ±40.7 degrees and ±56.8 degrees and thereby a device located in the section can be wrongly determined as a target device.

In the above-described embodiments of the present invention, the random jitter beamforming method and the transmitter and receiver using the same have been described by exemplifying a direction on a plane using the linear array antenna.

However, a two-dimensional (2D) antenna array may be applied to the random jitter beamforming method. In this case, a target direction may be set in a 3D space instead of a 2D plane, and random jitter beamforming may be performed.

In addition, in FIG. 7, the random jitter beamforming method is applied to an OFEM system by implementing in a frequency domain. However, this is merely an example, and it is possible to apply random jitter beamforming to a TDMA system by implementing in a time domain, or to apply random jitter beamforming to a CDMA system by implementing in a code domain.

According to the present invention, provided are a method and an apparatus that transmit a message at high resolution to only a target device located in a specific direction, and provided is an apparatus that receives a message at high resolution from only a target device located in a specific direction.

Moreover, according to the present invention, provided are a method and an apparatus that transmit a normal message to only a target device located in a specific direction, and provided is an apparatus that receives a normal message from only a target device located in a specific direction.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A random jitter beamforming method, comprising:
   dividing a series of binary sequences to generate a plurality of bit groups;
   designating a beam pattern, corresponding to each of the bit groups, from a set of two or more beam patterns having the same gain and phase in a target direction; and
   forming a beam with the corresponding beam pattern, for each of the bit groups.

2. The random jitter beamforming method of claim 1, wherein the designating of the beam pattern comprises randomly designating one beam pattern from the set of two or more beam patterns, for each of the bit groups.

3. The random jitter beamforming method of claim 1, wherein the designating of the beam pattern comprises designating the beam pattern to each of the bit groups according to a predetermined rule.

4. The random jitter beamforming method of claim 1, wherein the target direction is a direction of a target device.

5. A transmitter using random jitter beamforming, comprising:
   a bit group generation unit configured to divide a series of transmission binary sequences to generate a plurality of bit groups;
   a beam control unit configured to control a set of two or more beam patterns having the same gain and phase in a target direction;
   a beamforming unit configured to designate a corresponding beam pattern among the two or more beam patterns to each of the bit groups;
   a D/A conversion unit configured to convert each of the bit groups, of which the corresponding beam pattern has been designated, into an analog signal; and
   a transmission unit configured to transmit the analog signal.

6. The transmitter of claim 5, wherein the beamforming unit randomly designates one beam pattern from the set of two or more beam patterns, for each of the bit groups.

7. The transmitter of claim 5, wherein the beamforming unit designates the beam pattern to each of the bit groups in a predetermined order.

8. A receiver using random jitter beamforming, comprising:
a reception unit configured to receive an RF signal through an antenna array, and convert the RF signal into a continuous time baseband signal, wherein;
an A/D conversion unit configured to convert the continuous time baseband signal into discrete time domain signals equal to the number of antennas comprised in the antenna array;
a beam control unit configured to define and store an array coefficient vector for a beam pattern, wherein the array coefficient vector is based on dividing a binary sequence to generate a bit group; and
a beamforming unit configured to perform beamforming on the discrete time domain signal to generate a random-jitter-beamformed signal.

9. The receiver of claim 8, further comprising a bit group combination unit configured to generate a reception data sequence from a plurality of the random-jitter-beamformed signals.

10. A receiver using random jitter beamforming, comprising a cross-correlation coefficient calculation unit configured to calculate a cross-correlation coefficient with a binary sequence vector and a reception signal vector that are transmitted using random jitter beamforming, wherein the binary sequence vector is based on a binary sequence divided into a of bit group.

11. The receiver of claim 10, wherein, when the cross-correlation coefficient is greater than a predetermined threshold, the cross-correlation coefficient calculation unit determines the receiver as a target device with respect to the received binary sequence vector.

12. A receiving method using random jitter beamforming, the receiving method comprising:
receiving an RF signal through an antenna array, and converting the RF signal into a continuous time baseband signal;
converting the continuous time baseband signal into discrete time domain signals equal to the number of antennas comprised in the antenna array;
defining and storing an array coefficient vector for a beam pattern, wherein the array coefficient vector is based on dividing a binary sequence to generate a bit group; and
performing beamforming on the discrete time domain signal to generate a random-jitter-beamformed signal.

13. The receiving method of claim 12, further comprising:
generating a reception data sequence from a plurality of the random-jitter-beamformed signals by combining bit groups included in each of the random-jitter-beamformed signals.

* * * * *